No. 666,168. Patented Jan. 15, 1901.
I. C. WALKER.
HOG GUARD GATE.
(Application filed Mar. 17, 1900.)
(No Model.)
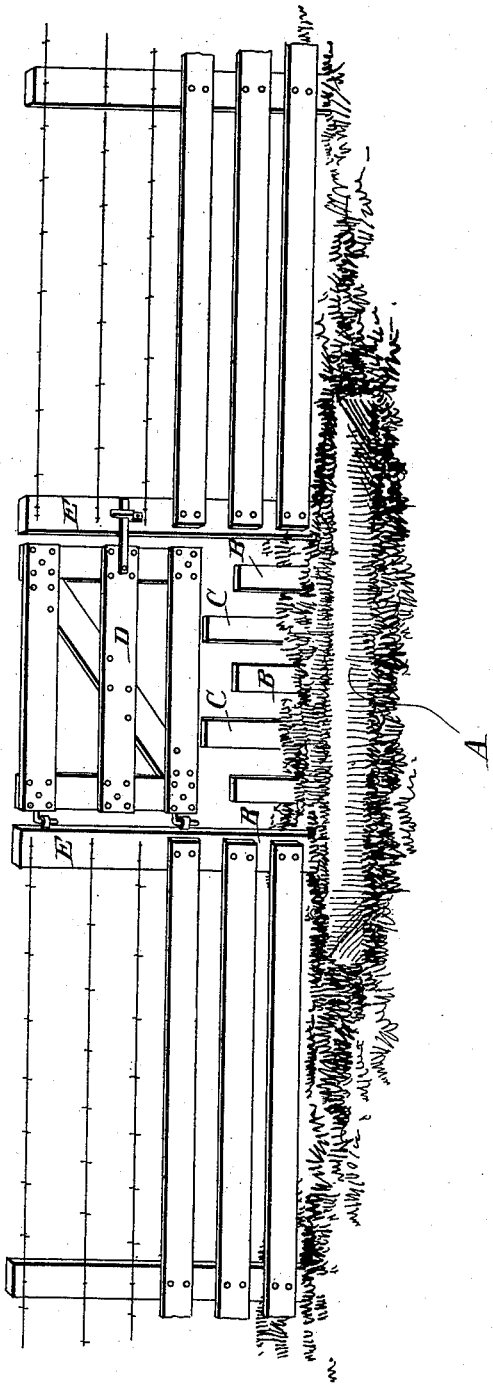
Witnesses:
Roy E Howser
J H Whitney
Inventor:
Ivan C. Walker
By Geo. Clammer
His Attorney.
THE NORRIS PETERS CO., PHOTO-LITHO., WASHINGTON, D. C.

UNITED STATES PATENT OFFICE.

IVAN C. WALKER, OF INDIANOLA, IOWA.

HOG-GUARD GATE.

SPECIFICATION forming part of Letters Patent No. 666,168, dated January 15, 1901.

Application filed March 17, 1900. Serial No. 9,044. (No model.)

*To all whom it may concern:*

Be it known that I, IVAN C. WALKER, a citizen of the United States, residing at Indianola, in the county of Warren and State of Iowa, have invented a new and useful Hog-Guard Gate, of which the following is a specification.

The object of my invention is to provide a gate by means of which hogs may be detained in one inclosure, while cattle are or may be permitted to pass from that inclosure to another through said gate. I attain this object by the device illustrated in the accompanying drawing, in which—

A is a ditch about eighteen inches deep, eighteen inches wide, and extending a short distance beyond the gate-posts $e$ $e$ and placed as near as may be to the gateway.

B B represent a row of posts situated about six inches from the ditch, said posts being six inches apart and eighteen inches in height.

C C represent a row of posts six inches in the rear of posts $b$ $b$, said posts being placed opposite the spaces between the posts $b$ $b$ and being twelve inches high.

D is an ordinary gate swinging over the upper part of said gateway.

When it is desired to permit cattle to pass freely from one inclosure to the other, the gate is opened, while in any case hogs are prevented from passing through the gateway by the ditch $a$ and the two rows of posts $b$ $b$ and $c$ $c$.

I do not claim anything for the gate $d$ except in combination with the other features of my invention.

What I do claim as my invention, and desire to secure by Letters Patent, is—

The combination, in a hog-guard gate, of a ditch on one side of a gateway, and two rows of posts on the other side of said gateway, placed substantially as hereinbefore set forth, with an ordinary gate for the upper half of the gateway, all substantially as herein set forth.

I. C. WALKER.

Witnesses:
E. E. HODGES,
J. H. WHITNEY.